United States Patent Office 3,408,384
Patented Oct. 29, 1968

3,408,384
4-METHOXY-3,5-DIMETHYLPHENYL METHYLCARBAMATE
Jerome G. Kuderna, Jr., and Donald D. Phillips, Modesto, Calif., assignors to Shell Oil Company, New York, N.Y., a corporation of Delaware
No Drawing. Filed Aug. 8, 1963, Ser. No. 300,921
1 Claim. (Cl. 260—479)

This invention relates to a novel aryl ester of methylcarbamic acid, and to the use of this ester as an insecticide, particularly for control of soil-dwelling insect life. As used herein, the terms, soil-dwelling insect life, and soil-dwelling insects, refer to insects which spend part or all of their life history in soil and/or on the surface of soil. Accordingly, the term, soil insecticide, as used herein refers to insecticides which are applied on soil and/or into soil for control of the soil-dwelling insects.

An important aspect of plant husbandry is the protection of the root systems of plants from attack by soil-dwelling insect life. Some of the important noxious soil-dwelling insects include: the seedcorn maggot, the anion maggot, the cabbage maggot, the turnip maggot, the carrot rust fly, the southern corn rootworm, the northern corn rootworm, the western spotted cucumber beetle, false wireworms, true wireworms, white grubs, Japanese beetle larvae, ants and termites.

To be a successful soil insecticide a compound must posses many properties; relatively few classes of compounds have been found to possess a sufficient number of these properties to sufficient degree. Firstly, it must of course be an effective insecticide against the insect life found in the soil; it must kill by contact, since few if any insects ingest sufficient soil to be subjected to a lethal dosage of the insecticide, and some insects, such as the wireworm, do not consume the husk or hull of seed, where the insecticide would be concentrated if it were used in a seed treatment. Second, the successful insecticide must be one which is readily disseminated in the soil, being present in the soil in a form and location readily accessible to the insect life (it must not be strongly adsorbed by the soil), yet it must have physical properties such that it is not readily lost from the soil—as by volatilization into the air, or by leaching from the soil when it is wetted by rain or during irrigation. Thirdly, the insecticide must not be toxic to seeds and plants in the soil at the insecticidally effective dosage, and must not damage seeds or roots in the soil in which it is disseminated. Fourthly, it must be persistent, to provide long-term protection of the plant. This requires that the insecticide be stable in the soil environment. Few effective insecticides are sufficiently stable under such conditions, for the soil environment imposes severe tests on the stability of compounds disseminated therein; water and oxygen are both present in the soil, subjecting the compound to hydrolytic and oxidative deterioration; chemicals in the soil—in fact, the particles of clay and other minerals which go to make up the soil—tend to degrade compounds introduced into the soil; micro-organisms present in the soil tend to break down compounds present in the soil.

For about the past decade, the halogenated hydrocarbons have been found to have the requisite combination of physical and chemical properties, together with the requisite toxicity to insects, required for a successful soil insecticide. Compounds such as DDT, aldrin, dieldrin, lindane, heptachlor, and chlordane, have dominated the soil insecticide field. Such compounds have been very effective. However, unfortunately, soil-dwelling insects have developed resistance to such halogenated insecticides, so that in many cases the halogenated insecticides are not longer sufficiently effective. Other compounds, such as organophosphorus compounds, have been developed as soil insecticides, but few have proven entirely satisfactory. There is currently, therefore, a substantial need for effective soil insecticides which will replace, or at least supplement, the halogenated hydrocarbon insecticides.

There now has been found a nitrogen-containing compound—containing no halogen—that appears to possess to the necessary degree the necessary spectrum of properties required of a successful soil insecticide. This compound is 4-methoxy-3,5-dimethylphenyl methylcarbamate. This compound has been found to effectively control soil-dwelling insects for extended periods of time, including insects which are resistant to chlorinated insecticides. This new carbamate has been found to be a highly active insecticide, with great stability and long life in soil. Further, it has been found to be readily available in the soil, apparently not being adsorbed by the soil to any significant extent, yet is not readily lost from the soil. Such properties are demonstrated by the fact that not only is this new carbamate effective for a long period of time in soil against soil-dwelling insects, but for extended periods of time readily kills insects which contact the surface of mud and other forms of soil which has been sprayed or otherwise impregnated with the new carbamate.

This latter property—the effectiveness against insects contacting soil which has been impregnated with the carbamate—is of great importance when considered with reference to the campaign to eliminate malaria-carrying mosquitoes in tropical areas. This campagin aims at breaking the chain of malaria transmission by spraying dwellings and other buildings in malarial zones with an insecticide to kill mosquitoes which invade those buildings. To be effective for such a purpose, an insecticide must have long life. Further, because many buildings in malarial zones—particularly in newly developing areas—are constructed of, and/or are finished with absorptive materials, the insecticide must be one whose effectiveness is not lost or destroyed when it is impregnated upon such absorptive materials. Thus, in tropical malarial areas, buildings often are built of absorptive plant materials; further, in these and other malarial areas, buildings often are plastered with mud or a cementitious plaster material—types of materials which are highly absorptive. The discovery that the novel carbamate of this invention maintains its insecticidal effectiveness for extended periods of time on mud and like absorptive materials therefore fills an urgent need.

The carbamate of this invention, 4-methoxy-3,5-dimethylphenyl methylcarbamate, is readily prepared by reacting 4-methoxy-3,5-dimethylphenol with methyl isocyanate in the presence of a catalytic amount of a catalyst such as a tertiary aliphatic amine.

The following example illustrates the method of preparing the carbamates of this invention. In this example, "parts" means parts by weight unless otherwise indicated, with parts by weight bearing the same relation to parts by volume as does the kilogram to the liter.

EXAMPLE I

Preparation of 4-methoxy-3,5-dimethylphenyl methyl-carbamate

A two-liter flask was charged with 255 grams of 4-methoxy-3,5-dimethylphenol [1] and 750 milliliters of methylene chloride. The mixture was heated to 40° with stirring to dissolve the solid and 1 milliliter of triethylamine was added. 105 grams of methylisocyanate was added dropwise at 40–45° over a two-hour period. Heating was continued for an additional 30 minutes, and about one-half of the solvent was removed by distilla- ---
[1] Kharasch, J. Org. Chem., 21:926 (1956); also Barnes, J. Chem. Soc., 1452 (1953).

tion. Approximately two volumes of hexane was added and the solution was cooled in an ice bath. The crystallized product was collected by filtration. After drying, the yield of 4-methoxy-3,5-xylyl methylcarbamate was 310 grams (88%), melting point: 103–104°.

Analysis (percent by weight) calculated for $C_{11}H_{15}NO_3$: N, 6.7; methoxyl, 14.8. Found: N, 6.5; methoxyl, 14.2.

As will be evident from the foregoing example, the reaction of the phenol and methyl isocyanate is most conveniently carried out in a suitable solvent, methylene chloride being quite suitable for this purpose. Further, the reaction is conveniently conducted at about room temperature. Moderately elevated temperatures—say, up to about 60° C.—can in some cases be used to reduce the requisite reaction time.

The carbamate of this invention possesses insecticidal activity and is an effective soil insecticide of extended life in soil, as is evidenced by the results of experiments set out in Example II.

It is understood that while the carbamate of this invention is primarily of interest as a soil insecticide—because it is effective in soil, and so few insecticides are—it also is useful as a general purpose insecticide, inasmuch as it is toxic to a variety of insect species.

By the term "insects" is meant not only the members of the class *insecta*, but also related or similar invertebrate species belonging to the allied classes of arthropods and including ticks, mites, spiders, wood lice and the like.

The effectiveness of the compound of this invention as an insecticide is demonstrated by the following experiments and the results thereof.

EXAMPLE II

The activity of 4-methoxy-3,5-dimethylphenyl methylcarbamate with respect to the corn earworm, *Heliothis zea*, was determined by caging corn earworm larvae on cut broad bean plants inserted in water after a formulation of the test compound, prepared by dissolving an acetone solution of the compound in water, had been sprayed thereon. Two replicates were used with each test, various tests being directed to different concentrations of the test compound in the liquid formulations. The $LC_{50}$ value—that is, the concentration of the test compound in the solution to kill 50% of the test insects—was found to be 0.0036% by volume.

EXAMPLE III

The extended effectiveness of the carbamate of this invention was tested as follows: a 4-methoxy-solution of the compound in acetone was sprayed upon the surface of plywood panels and test insects caged against the treated panels, one series of exposures being made immediately after application of the test material, and later series of exposures being made at weekly intervals thereafter. The test insects were adult *Anopheles albimanus* mosquitoes.

At a dosage of 50 milligrams of the test material per square foot of the surface of the wood, the following mortalities were obtained:

| Weeks after treatment of wood: | Percent mortality |
| --- | --- |
| 0 | 100 |
| 1 | 100 |
| 2 | 100 |
| 4 | 100 |
| 8 | 100 |
| 24 | 100 |
| 38 | 80 |

EXAMPLE IV

The effectiveness and long life of the insecticide of this invention in soil was demonstrated by the following tests.

An acetone solution of the test compound was spayed onto soil, as the soil was being tumbled in a mixer, so as to uniformly disseminate the test compound into the soil and provide a concentration of 3.3 parts by weight of the test material per million parts by weight of the soil. The soil then was dried to remove the acetone, moistened with water and divided into jars. The jars were sealed and held at 72° F. One day after the soil had been placed in the jars, certain of the jars were opened and third instar larvae of the western spotted cucumber beetle (*Diabrotica undecimpunctata*) were introduced into the soil. The jars were sealed, held for 24 hours, then the mortality of the larvae was determined. This procedure was repeated at intervals of 7, 14, 21 and 28 days after introduction of the treated soil into the jars.

It was found that the test compound gave 100% control of the larvae for at least 21 days, with 88% control at the end of 28 days.

The compound of this invention can be employed for insecticidal purposes by the use of any of the techniques which are conventionally employed in the art, with due regard to the particular application contemplated—i.e., whether the compound is to be applied to the surfaces of plants, buildings and the like, and including the surface of soil, and absorptive materials such as paper, sand, bricks, concrete, plaster, plant materials used in buildings, and the like, whether it is to be disseminated into soil, whether it is to be incorporated into surface coatings, such as waxes, resins, paints, lacquers, varnishes, whether it is to be incorporated in various plastic materials, including plastic sheetings, in order to obtain packaging and wrapping materials themselves resistant to insect attack, or whether it be used in some other manner such as to exploit the long life of the compound of the invention.

When the compound of this invention is to be used as a conventional insecticide applied to surfaces—of plants, buildings, soil and other absorptive materials or the like—the compound can either be sprayed or otherwise applied in the form of a solution of dispersion, or it can be absorbed on an inert, finely divided solid and applied as a dust. Useful solutions for application by spraying, brushing, dipping, and the like can be prepared by using as the solvent any of the well-known inert horticultural carriers, including neutral hydocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins gelatin, casein, long-chain fatty alcohols, alkyl aryl sulfonates, long-chain alkyl sulfonates, phenol-ethylene oxide condensates, $C_{12}$ to $C_{20}$ amines and ammonium salts, and the like. These solutions can be employed as such, or more preferably they can be dispersed or emulsified in water and the resulting aqueous dispersion or emulsion applied as a spray. Solid carrier materials which man be employed include talc, bentonite, lime, gypsum, pyrophyllite and similar inert solid diluents. If desired, the compound of the present invention can be employed as an aerosol, as by dispersing the same into the atmosphere by means of a compressed gas.

The concentration of the compound to be used with the above carriers is dependent upon many factors, including the particular carrier employed, the method and conditions of application, and the insecticide species to be controlled, a proper consideration and resolution of these factors being within the skill of those versed in the insecticide art. In general, however, the compound of this invention is effective in concentrations of from about 0.01 to 0.5% based upon the total weight of the composition, though under some circumstances as little as about 0.00001% or as much as 2% or even more (for example, up to 25% of the total weight of the mixture) of the compound can be employed with good results from an insecticidal standpoint, as wherein high concentrations of active material are used in low-volume sprays or dusts.

The compound of this invention is employed as a soil insecticide by conventional techniques which insure uniform intimate dissemination of an effective dosage of the compound in the soil. Judging by the experimental work which has been performed, the insecticidally effective dosages of the compound of the invention lies in the range of a few parts per million parts by weight of the soil. Thus, the effective dosages appear to lie within the range of from about one or two parts, up to about fifty to one hundred parts per million, on a weight basis based on the weight of the air-dry soil. This is not to say that in some cases, a higher dosage—of up to as much as 500 parts by million on the same basis—may not be used to advantage, but in most cases the effective dosage appears to lie within the range of from about 2 to about 50 parts per million on that basis. In more practical terms, the effective dosage appears to amount to from about 0.25 to about 100 pounds of the insecticide per acre of land, depending upon the depth of soil to be treated, which may be as great as 6, or 8, or even 12 inches, depending upon the particular species of plants involved. Generally, dosages of from about 1 to about 10 pounds of the insecticide per acre of land are preferred.

The compound of the invention is a solid at ordinary atmospheric temperatures. It may be applied to the soil neat—as by grinding the solid insecticide, then admixing the resulting dust or powder with the soil to be treated. (The powdered insecticide is advantageously premixed with an inert particulate diluent to aid in uniform dissemination of the insecticide in the soil.) Alternatively, the insecticide may be dissolved and/or dispersed in a suitable liquid diluent and the solution or dispersion applied to and mixed with the soil, or the insecticide may be formulated with a suitable solid carrier and applied as a dust, powder or as granules to the soil and admixed therewith. The carbamate is not very soluble in water, so that water is not a suitable solvent. By the use of suitable emulsifying and dispersing agents, however, the carbamate can be emulsified or dispersed in water and the emulsion applied to the soil to be treated to provide effective control of the insect therein. Any of the usual emulsifying and dispersing agents commonly employed in forming aqueous emulsions and suspensions of water-insoluble materials can be used for this purpose. Generally but a small concentration of the emulsifying agent is required, as little as 0.05 percent of the weight of the final formulation being effective in many cases, while seldom will more than about 10% of the weight of the final formulation be required. Usually, the concentration of the emulsifying or dispersing agent will be from about 0.5 to about 5 percent of the weight of the formulation. Alternatively, or in addition, in some cases it may be to advantage to dissolve the carbamate in a solvent which can readily be dispersed in water to produce a heterogeneous dispersion of the insecticide in the water.

Where the carbamate insecticide is to be applied as a solution, suitable solvents include water-immiscible alcohols, ketones and aromatic hydrocarbons, such as, for example, isopropyl alcohol, benzene, acetone, methyl ethyl ketone, secondary butyl alcohol, kerosene, chlorinated hydrocarbons, various non-phytotoxic hydrocarbon fractions which are ordinarily used in disseminating agricultural chemicals, including spray oils, horticultural oils, and the like.

The suitable solid carriers ordinarily are those which are essentially inert in the soil and which are not hygroscopic—for if they are hygroscopic the final formulation will not remain dry and free-flowing. In some cases, however, it may be desirable to employ as carrier a solid which is not inert—as, for example, a solid fertilizer such as a commercial mixed solid fertilizer, rock phosphate, urea or the like. Suitable carriers are those well known to the art including the clays such as the laolinites, the bentonites and the attapulgites; other minerals in natural state such as talc, pyrophyllite, quartz, diatomaceous earth, fuller's earth, chalk, rock phosphate and sulfur; and chemically modified minerals, such as acid washed bentonites, precipitated calcium phosphates, precipitated calcium carbonate and colloidal silica. These diluents may represent a substantial portion, for example, 50 to 98 percent by weight of the entire formulation.

These solid formulations can be prepared by grinding or air-milling the carrier and insecticide together. Alternatively, the solid formulations can be formed by dissolving the insecticide in a suitable solvent, such as a volatile solvent, impregnating and/or coating the particles with the solution and if necessary, removing the solvent. The formulation also can be effected by melting the insecticide and mixing the molten insecticide with the carrier. Granular formulations can be prepared by impregnating and/or coating granules of the carrier with the insecticide or by forming granules of mixtures of the insecticide and carrier.

From the standpoint of mechanics, the insecticide, neat or as a formulation, is applied to the soil in any manner which enables its intimate admixture with the soil to be treated. Thus the insecticide, which includes formulations thereof, can be applied to the surface of the soil, or it can be applied below the surface of the soil, and then admixed with the soil. If in the form of a liquid formulation, the insecticide can be drenched onto the surface of the soil or injected into the soil. In other words, conventional means, well known in the art, can be used to effect intimate admixture of the insecticide with the soil to be treated.

The carbamate of this invention is characterized by an extended effective life in the soil and essentially no phytotoxicity at the insecticidally effective dosages. Consequently, it may not in all cases be necessary to treat the entire mass of insecticide-infested soil—in some cases it may be sufficient to treat only the soil of the rhizosphere of the plants to be protected. Thus, the soil immediately surrounding the roots of established trees can be treated to protect the trees, and row crops can be protected by treating only the soil which will surround the roots of the plants in each before the seeds or plants are planted, or after the plants have been planted. The formulations of the insecticide can also contain other materials, such as nematocides, fungicides, insecticides of different action and/or different physical characteristics, hormones, and/or fertilizers, to form multipurpose compositions.

The carbamate of this invention also can be used to control soil-dwelling insects by treating seed with the carbamate.

We claim as our invention:
1. 4-methoxy-3,5-dimethylphenyl methylcarbamate.

References Cited

UNITED STATES PATENTS

| | | | |
|---|---|---|---|
| 3,131,215 | 4/1964 | Lemin | 260—479 |
| 2,632,769 | 3/1953 | Bell et al. | 260—479 |
| 2,830,006 | 4/1958 | Britwell et al. | 167—30 |
| 2,865,803 | 12/1958 | Lewis | 167—30 |

FOREIGN PATENTS

| | | |
|---|---|---|
| 223,028 | 7/1959 | Great Britain. |
| 1,143,670 | 2/1963 | Germany. |

OTHER REFERENCES

Metcalf et al.: Journal Economic Entomology, vol. 53, pp. 828 to 832 (1960).

Metcalf, Pest Control, vol. 30, pp. 20, 26 and 28, June 1962.

LORRAINE A. WEINBERGER, *Primary Examiner.*

J. S. LEVITT, M. G. BERGER, I. PELLMAN, G. A. MENTIS, *Assistant Examiners.*